April 20, 1954  A. R. WHITE  2,675,919
COMPRESSIBLE OIL FILTER PACK
Filed Dec. 4, 1951  3 Sheets-Sheet 2
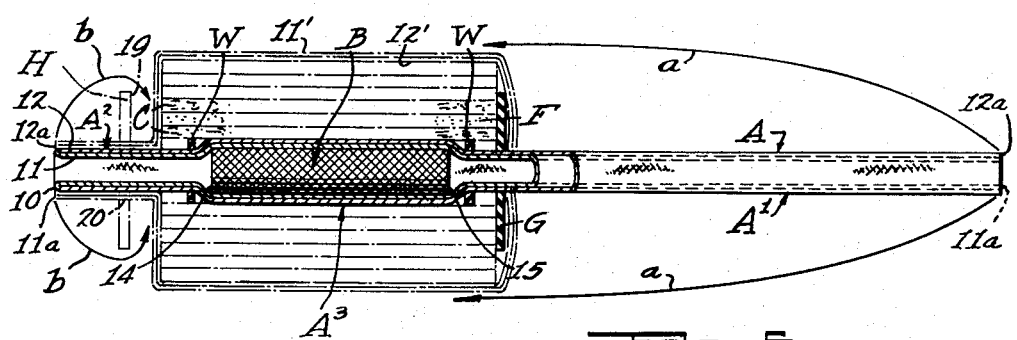
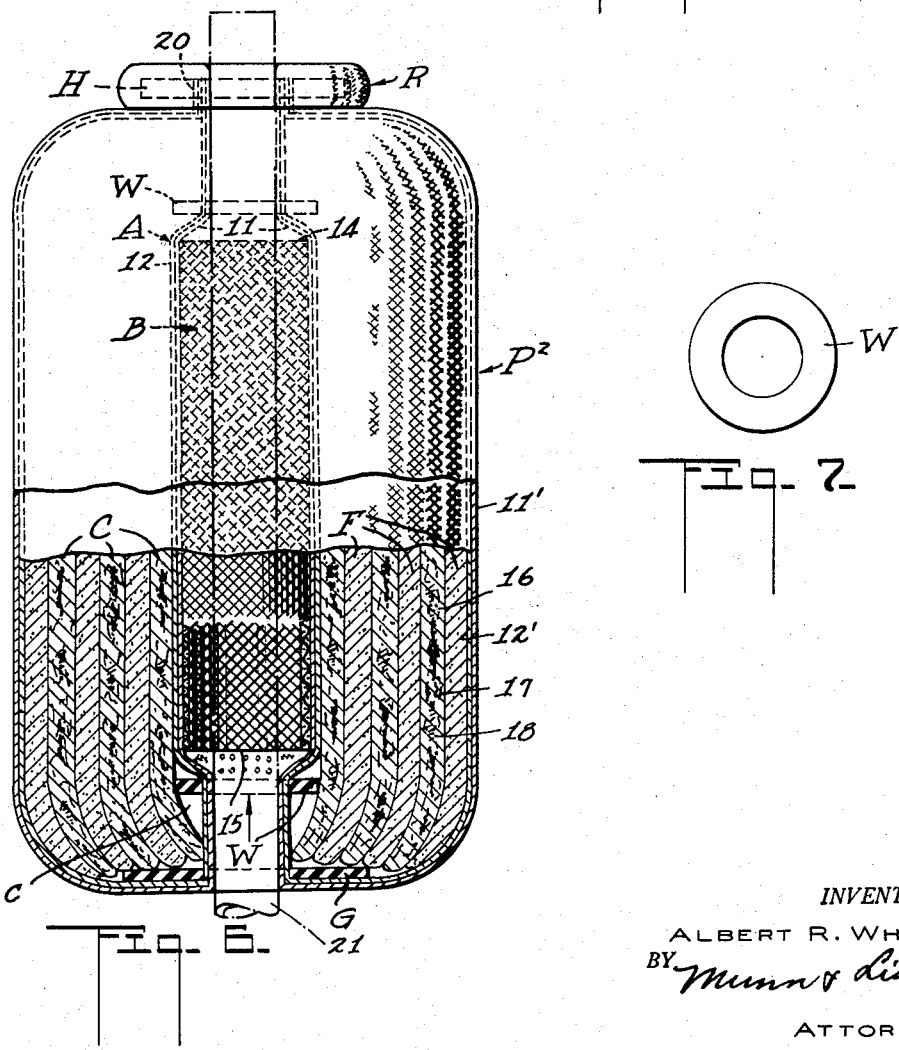
INVENTOR.
ALBERT R. WHITE
BY Munn & Liddy
ATTORNEYS April 20, 1954  A. R. WHITE  2,675,919
COMPRESSIBLE OIL FILTER PACK
Filed Dec. 4, 1951  3 Sheets-Sheet 3
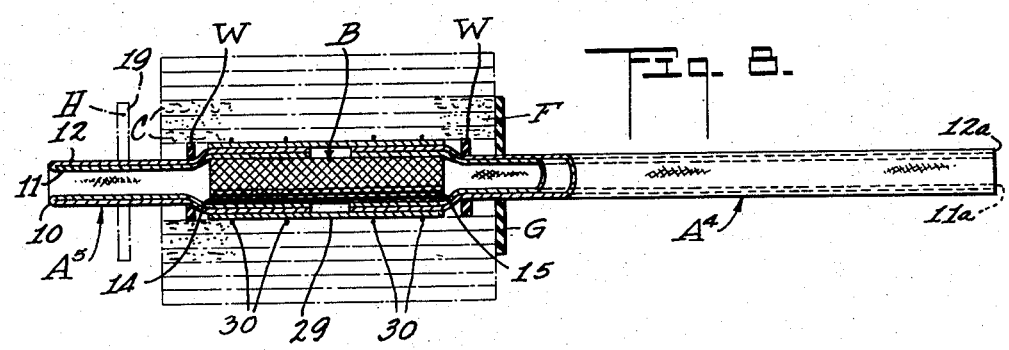
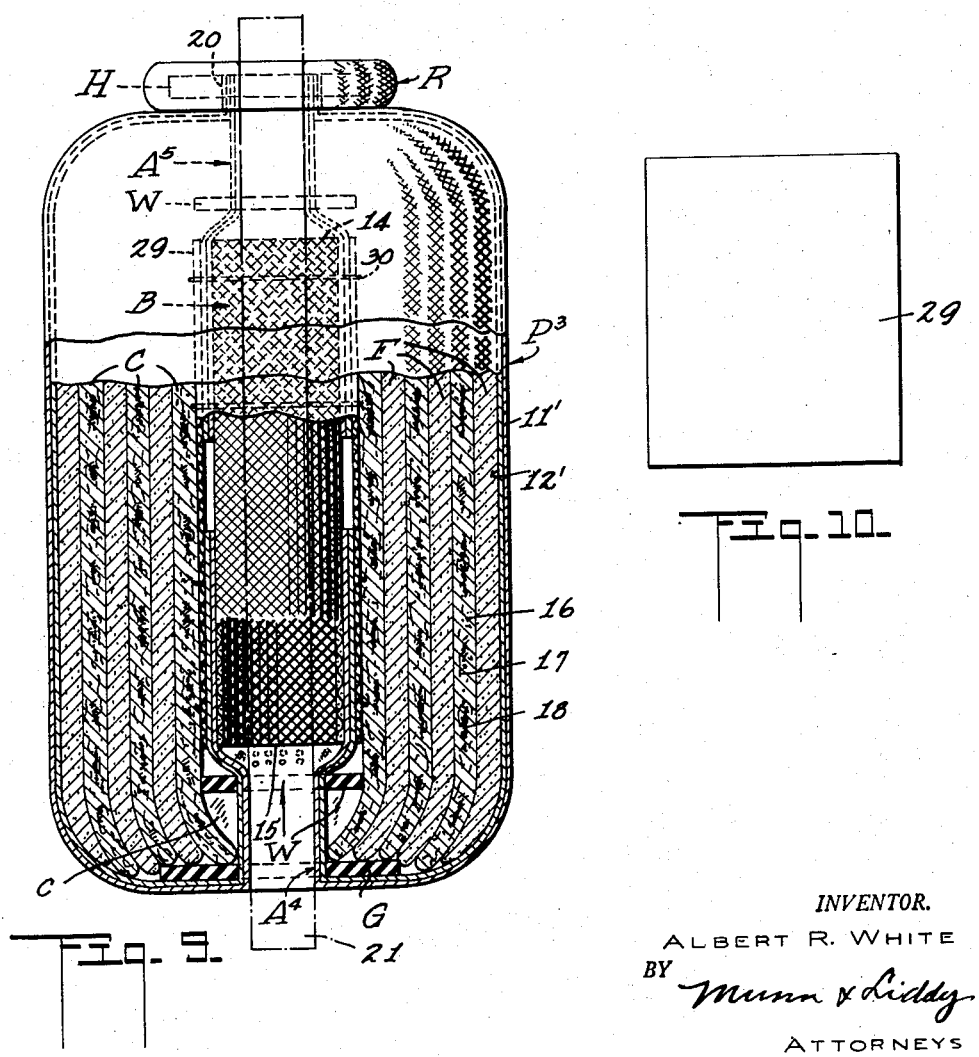
INVENTOR.
ALBERT R. WHITE
BY *Munn & Liddy*
ATTORNEYS

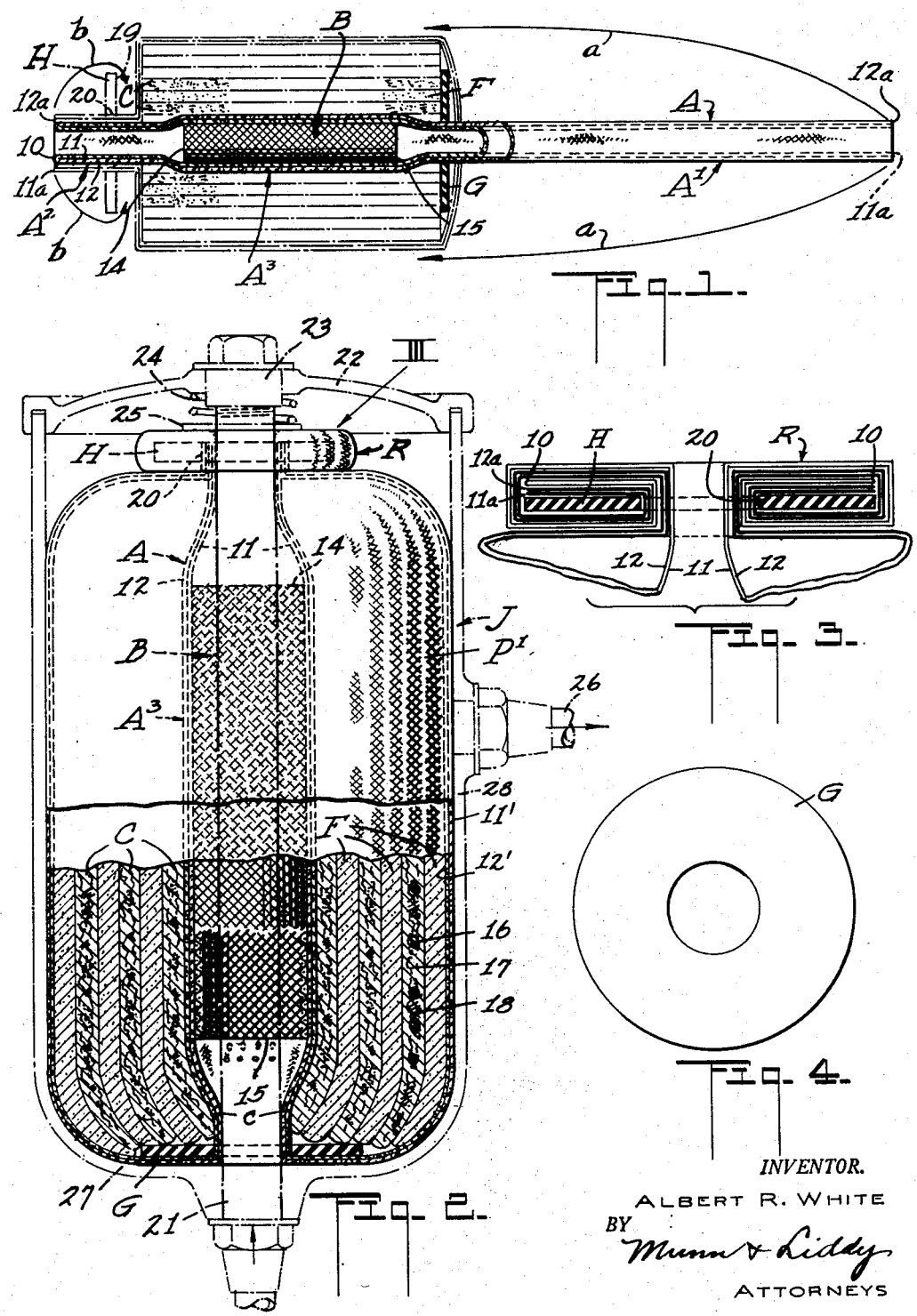

Patented Apr. 20, 1954

2,675,919

UNITED STATES PATENT OFFICE 2,675,919

COMPRESSIBLE OIL FILTER PACK

Albert R. White, Glendale, Calif.

Application December 4, 1951, Serial No. 259,819

4 Claims. (Cl. 210—148)

The present invention relates to improvements in a compressible oil filter pack. It has particular reference to a pack of this character, which is produced by the steps disclosed in my co-pending application for Letters Patent, entitled "Method of Making an Oil Filter Pack," Serial No. 259,820, filed in the United States Patent Office on December 4, 1951.

It is proposed in this invention to provide an oil filter pack which is designed to have a high rate of efficiency in absorbing contaminants from oil being filtered. Briefly stated, the filtering materials are arranged in successive layers so as to offer consecutive stages of filtration as the oil passes therethrough. Experience has shown that the passing of the oil through successive stages of filtration, one following the other, produces better results than would be obtained by flowing the oil through the same materials confined in a single layer.

Moreover, I propose to provide a filter pack having oil-seal and bearing washers incorporated thereinto to preclude the oil from by-passing the filtering materials. In addition, these washers are disposed in such a manner as to reinforce the pack at points where such reinforcement is needed, for instance, the top and bottom of the pack. Also, the washers thus provided act to center the pack nicely around the central pipe of the filter shell, holding the pack at its top and bottom in proper position.

As a still further object of the invention, it is proposed to provide an oil filter pack that may be compressed at its top and bottom so as to expand the body of the pack laterally to completely bridge across the filter shell.

Another object is to encase the filtering material in tubular webbing, and to utilize one of the oil-seal washers for anchoring and concealing the ends of the webbing in place.

Other objects and advantages will appear as the specification continues. The novel features will be set forth in the claims hereunto appended.

DRAWINGS

For a better understanding of my invention reference should be had to the accompanying drawings, forming part of this application, in which:

Figure 1 is a longitudinal sectional view taken through one form of a partially completed oil filter pack;

Figure 2 is an elevational view, partly in section, of the first embodiment of a finished pack;

Figure 3 is an enlarged diagrammatic view of the upper portion of Figure 2, as suggested by the arrow III in the latter, disclosing the ends of the tubular webbing anchored around an oil-sealing and bearing washer;

Figure 4 is a face view of one of the washers employed in Figures 1 and 2;

Figure 5 is a view similar to Figure 1, but illustrating additional oil-seal washers arranged interiorly of a modified form of my pack;

Figure 6 is an elevational view of the second embodiment of the pack, with parts in section;

Figure 7 is a face view of the additional oil-seal washers utilized in Figures 5 and 6;

Figure 8 is a view similar to Figure 5, but disclosing the tubular webbing made in two separate sections, with adjacent ends of this webbing being bridged by a piece of cloth;

Figure 9 is a sectional view of the third embodiment of my pack, portions being shown in elevation; and Figure 10 is a plan view of the piece of cloth utilized in Figures 8 and 9.

While I have shown only the preferred forms of my invention it should be understood that various changes, or modifications, may be made within the scope of the appended claims without departing from the spirit thereof.

DETAILED DESCRIPTION

First embodiment

Referring now to the first form of my invention, as illustrated in Figures 1 to 4, inclusive, it will be noted that Figure 1 discloses a partially completed pack, while the finished product is shown in Figure 2 of the drawings.

As clearly illustrated in Figure 1, a tubular webbing A is folded back upon itself, as at 10, so as to present inner and outer sections 11 and 12, respectively. The free marginal ends 11a and 12a of these respective sections are arranged in registration with one another during the folding back of the webbing. Moreover, this webbing is fashioned from suitable loosely-knitted or woven fabric material that will withstand considerable stretching without tearing.

After the tubular webbing A has been thus folded, a woven wire cloth, perforated, or poriferous core B is telescoped thereinto, with the webbing gripping the core to hold the latter in place. When inserting the core B into the tubular webbing A, the right-hand or longer free section A1 of the webbing projects a greater distance beyond the core than the left-hand or shorter free section A2 of the webbing, as disclosed in Figure 1.

Next the filtering materials for the body of the filter are applied spirally around the core-supported intermediate portions A3 of the tubular webbing, with these filtering materials extending beyond opposing ends 14 and 15 of the cloth or perforated core B.

In order to provide a highly efficient filter pack, I employ successive layers of "coarse" and "fine" materials C and F, respectively. The "fine" layers are made from cotton of fairly uniform thickness. In actual practice, the "coarse" layers are composed of a combination of cotton 16, cotton threads 17 in the form of waste, and flake-like or wafer-like particles 18 of paper materials thoroughly mixed together to form a filtering mass. This paper may vary in thickness from tissue to heavier gauge.

These layers of filtering material may be applied readily around the core by the machine disclosed in my United States Letters Patent No. 2,471,595, dated May 31, 1949. In the process of winding, successive layers C and F are formed so as to offer consecutive stages of filtration—not just one passing of the oil through one like mass.

The passing of the oil through a single layer of cotton and a layer of the combination filter mass is good filtration. Then, passing of the oil through successive stages, say three or more of the cotton F and the filter mass C, one right after the other, is better filtration. The latter arrangement has given more remarkable results than having oil pass through the same materials confined in a single element, without benefit of successive layers of these same materials. The layer construction of my pack will cause the absorbing of large proportions of contaminants from the oil so that the outermost layer remains comparatively clean.

As the next step, I apply a large flexible washer G over the longer tubular section A1 of the webbing, bringing it up against the right-hand end of the layers of filtering materials in the manner illustrated in Figure 1. This washer is made of synthetic rubber, commonly known as "neoprene," which will withstand the action of oil without deteriorating. When the pack is moved into a vertical position, as shown in Figure 2, the washer G is disposed at the base of the filter pack or element.

Now both the inner and outer tubular webbings of the longer section A1 are turned back over the filtering layers, as suggested by the arrows a, and are extended all the way toward the left in Figure 1 until the marginal ends 11a and 12a register with the fold 19 of the shorter section A2 (see Figure 1). Thus there will be four thicknesses of the tubular webbing at the left of the pack body at this time, as indicated in Figure 1. Also, the turned-back portions of the webbings provide flexible and poriferous casings 11' and 12' entirely enclosing the filtering materials.

For the purpose of anchoring these four thicknesses of webbing into a unitary structure, a second "neoprene" washer H is telescoped over the outermost of these four tubular webbings now disposed at the left-hand side of Figure 1. Thereafter, all four of these webbings (two from the section A1 and two from the section A2) are stretched and drawn back over the outside surface of the washer H, and inserted underneath the surface 19 of this washer now facing the body of the pack, as indicated by the arrows b in Figure 1.

Next, the washer H is inverted or turned inside out, pulling the webbings therewith (see Figure 3). This will give a total of eight thicknesses of webbings extending through the bore 20 of the washer H. This washer securely anchors the sections A1 and A2 together. All ends of the tubular webbings are concealed from exterior view and are firmly held in place. When the finished pack is moved into vertical position, as in Figure 2, the washer H will be at the top thereof.

Referring to Figure 2, I have shown a conventional type of an oil filter shell J having a centrally-disposed perforated tube 21 rising therein. The first form of my completed oil filter pack P1 (see Figure 2) is adapted to be telescoped downwardly over this tube, with the latter passing upwardly through the interior of the woven wire cloth or perforated core B. The lower and upper washers G and H, respectively, provide oil seals at the ends of the pack P1, which embrace the tube 21.

In this type of oil filter, a removable cover 22 is secured over the top of the shell J by a nut 23, which is threaded onto the upper end of the central tube. Also, it is common practice to employ a spring 24 for urging a metallic washer 25 downwardly over the tube and against the top of the filter pack or element P1. The oil outlet pipe for the shell is designated at 26. Of course, the pipe 26 could be used as an inlet, if so desired, in which event the tube 21 would be utilized as an outlet.

The pack P1 is built to have a greater length than the height of the filter shell J. Accordingly, when the pack rests on the bottom 27 of the shell and the cover 22 is drawn down into place, the ends of the pack are compressed. This will cause the body of the pack to expand laterally into contact with the annular wall 28 of the shell, substantially filling the filter shell. In this connection, it will be observed that the filtering layers C and F project beyond the upper and lower ends 14 and 15, respectively, of the core B, thus permitting the ends of the pack to be compressed.

The flat washer H at the top of the pack grips the center tube 21 when the pack is compressed, holding the latter down to size. The several thicknesses of webbings surrounding this washer provides an exterior ring-like element R on the top of the pack against which the metallic washer 25, or other pack-contacting means on the cover 22, is adapted to bear instead of on the pack body.

Moreover, it will be noted that the washers G and H reinforce the ends of the pack P1. These washers act to center the pack around the tube 21, holding the pack at its top and bottom in proper position. The washers G and H not only serve as oil seals at the ends of the pack, but help greatly to keep the pack in cylindrical shape, even though the pack is handled roughly. The lower washer G serves as a firm base on which the pack rests in the filter shell. Both flexible washers are external to the main part of the pack body in the finished article, and serve to make more firm what might be otherwise a more flimsy pack at the ends.

When withdrawing the used pack P1 from the filter shell J, the ring-like element R provides a hand grip, which may be grasped so as to lift the pack out of the shell.

Having thus described the various parts of the first form of my oil filter pack or element, the use thereof is summarized briefly as follows:

The pack P1 is inserted into the filter shell J, with the tube 21 projecting upwardly through the washers G and H, and further extending through the interior of the woven wire cloth or perforated core B. With the base of the pack resting on the bottom 27 of the filter shell, the cover 22 is applied over the top of the shell J. Upon tightening the nut 23, this cover and the metallic washer 25 cause the ends of the pack to be compressed, resulting in expanding the body of the pack into contact with the annular wall 28 of the filter shell.

Assuming that the oil is conveyed by the tube 21 into the interior of the pack, this oil must pass through all of the layers of the "coarse" filtering material C and the "fine" materials F before reaching the outlet pipe 26. This oil is subjected to successive stages of filtration, say three or more. These filtering layers will absorb the contaminants from the oil, and the outermost layer of the pack will be comparatively clean.

The flexible washers G and H provide oil seals between the central tube 21 and the pack, precluding oil from by-passing the filtering layers. Furthermore, these washers reinforce the ends of the pack P1 and hold the latter in position relative to the central tube of the filter shell. All ends of the tubular webbing A are confined within the ring-like element R at the upper end of the pack.

It will be noted that the filtering body defines a bore c extending therethrough between opposing ends of this body. The tubular webbing A provides a liner for this bore, and further encases the exterior surface of the filtering body. Moreover, the end sections of this webbing are telescoped over one another at one end of the filtering body; and, in turn, these end sections are wrapped around the washer H so as to anchor the end webbing sections together.

Second embodiment

In Figures 5 to 7, inclusive, I have shown the forming of a slightly modified form of an oil filter pack P2. The latter is quite similar to the pack P1 previously described, and like reference numerals have been applied to corresponding parts.

This embodiment provides for the addition of a pair of "neoprene" washers W, which are telescoped over the outer section 12 of the tubular webbing that surrounds the core B. It will be noted that these washers are disposed adjacent to the ends 14 and 15 of the core. They are disposed on the interior of the filter body, and serve as additional oil seals, which embrace the central tube 21, as clearly shown in Figure 6 of the drawings. Otherwise the construction and operation of the packs P1 and P2 are identical with one another.

The additional washers W are disposed adjacent to the ends 14—15 of the foraminous core B, thus precluding the latter from sliding within the tubular webbing.

Third embodiment

Turning now to the third form of my invention, Figures 8 to 10, inclusive, disclose the forming of an oil filter pack P3. The principal structural difference between this pack and the pack P2 lies in the construction of the tubular webbings, which are made in two separate sections A4 and A5 instead of a single tube as in the second embodiment.

In Figures 8 and 9, I show the long and short webbing sections A4 and A5, respectively, as being telescoped over the woven wire cloth or perforated core B. Thereafter, a piece of cloth 29 is wrapped around the adjacent ends of these webbing sections and secured thereto by any suitable means, for instance by strings 30.

It will be observed that the pack P3 shown in Figure 9 is identical with the pack P2 illustrated in Figure 6, excepting for the differences in the tubular webbings and the addition of the piece of cloth 29 mentioned above. Like reference numerals have been employed to designate corresponding parts. Of course, the interior washers W in Figure 9 could be omitted, if desired, producing a pack similar to the one shown in Figure 2 of the drawings.

I claim:

1. In an oil filter pack: a body of filtering material defining top and bottom ends, and having a bore extending therethrough between said ends of the body; a tubular webbing provided with an intermediate portion forming a liner for the bore of the filtering body; this webbing having an upper end section projecting above the top end of the filtering body, and further including an opposing end section turned back over the exterior of the filtering body to entirely encase the latter; these two end sections of the webbing being telescoped one over the other in overlapping relation at the top end of the filtering body and extending thereabove; a perforated tubular core disposed within the bore-liner portion of the webbing, and thus arranged on the interior of the filtering body; a resilient oil-sealing base washer abutting the lower end of the filtering body, and being fashioned with a wall-defining opening through which the tubular webbing projects; the webbing being disposed in snug engagement with the wall of the opening in this base washer, and providing an unobstructed passage through which an oil tube may be inserted; and a second resilient oil-sealing washer disposed exteriorly of the filtering body above the latter, and having a wall-defining opening therein; both of the upper overlapped sections of the tubular webbing extending through the opening in the second washer, with the innermost upper section of the webbing providing an unobstructed passage through which said oil tube may extend; the overlapped sections of the tubular webbing being wrapped around and anchored to the second washer to enclose the latter; the second washer and the tubular webbing wrapped therearound providing an exposed element disposed at the top of the pack to constitute a lifting handle therefor.

2. In an oil filter pack: a body of filtering material defining top and bottom ends, and having a bore extending therethrough between said ends of the body; a tubular webbing provided with an intermediate portion forming a liner for the bore of the filtering body; this webbing having an upper end section projecting above the top end of the filtering body, and further including an opposing end section turned back over the exterior of the filtering body to entirely encase the latter; these two end sections of the webbing being telescoped one over the other in overlapping relation at the top end of the filtering body and extending thereabove; a perforated tubular core disposed within the bore-liner portion of the webbing, and thus arranged on the interior of the filtering body; a resilient oil-sealing base washer abutting the lower end of the filtering body, and being fashioned with a wall-defining opening through which the tubular webbing projects; the webbing disposed in snug engagement with the wall of the opening in this base washer, and providing an unobstructed passage through which an oil tube may be inserted; and a second resilient oil-sealing washer disposed exteriorly of the filtering body above the latter, and having a wall-defining opening therein; both of the upper overlapped sections of the tubular webbing extending through the opening in the second washer, with the innermost upper section of the webbing providing an unobstructed passage through which said oil tube may extend; the overlapped sections of the tubular webbing being wrapped around and anchored to the second washer to enclose the latter; the second washer and the tubular webbing wrapped therearound providing an exposed element disposed at the top of the pack to constitute a lifting handle therefor; said tubular core being substantially cylindrical and defining upper and lower ends; and additional oil-sealing washers disposed on the interior of the filtering body adjacent said ends of the tubular core; these additional washers having openings through which the intermediate portion of the tubular webbing extends, which openings are smaller than the diameter of the tubular core to thereby constrict the webbing adjacent said ends of the core and preclude the core from sliding within the tubular webbing.

3. In an oil filter pack: a body of filtering material having a bore extending therethrough between opposing ends of the body; a tubular webbing providing a liner for this bore, and further encasing the entire exterior surface of the filtering body so as to constitute a complete enclosure for the filtering material; this webbing having end sections telescoped over one another in overlapping relation to project endwise beyond one end of the filtering body; and a resilient oil-seal bearing washer disposed exteriorly of the filtering body and being telescoped over these overlapped end sections of the webbing; the projecting webbing sections being wrapped around this washer to enclose the latter and to anchor the end webbing sections thereto; this washer and the webbing sections providing an exposed element disposed at one end of the pack to constitute a lifting handle therefor.

4. In an oil filter pack: a body of filtering material defining top and bottom ends, and having a bore extending therethrough between said ends of the body; a tubular webbing provided with an intermediate portion forming a liner for the bore of the filtering body; this webbing having an upper end section projecting above the top end of the filtering body, and further including an opposing end section turned back over the exterior of the filtering body to entirely encase the latter; these two end sections of the webbing being telescoped one over the other in overlapping relation at the top end of the filtering body and extending thereabove; a resilient oil-sealing base washer abutting the lower end of the filtering body, and being fashioned with a wall-defining opening through which the tubular webbing projects; the webbing being disposed in snug engagement with the wall of the opening in this base washer, and providing an unobstructed passage through which an oil tube may be inserted; and a second resilient oil-sealing washer disposed exteriorly of the filtering body above the latter, and having a wall-defining opening therein; both of the upper overlapped sections of the tubular webbing extending through the opening in the second washer, with the innermost upper section of the webbing providing an unobstructed passage through which said oil tube may extend; the overlapped section of the tubular webbing being wrapped around and anchored to the second washer to enclose the latter; the second washer and the tubular webbing wrapped therearound providing an exposed element disposed at the top of the pack to constitute a lifting handle therefor.

References Cited in the file of this patent

UNITED STATES PATENTS

| Number | Name | Date |
|---|---|---|
| 754,053 | Derham | Mar. 8, 1904 |
| 980,832 | Pittelkow | Jan. 3, 1911 |
| 1,898,027 | Winslow | Feb. 21, 1933 |
| 2,098,102 | McLean | Nov. 2, 1937 |
| 2,143,044 | Wicks et al. | July 10, 1939 |
| 2,197,471 | Hooper | Apr. 16, 1940 |
| 2,301,121 | Kamrath | Nov. 3, 1942 |
| 2,314,640 | Winslow et al. | Mar. 23, 1943 |
| 2,394,895 | Burhans | Feb. 12, 1946 |
| 2,427,733 | McCann | Sept. 23, 1947 |
| 2,435,707 | Bray et al. | Feb. 10, 1948 |
| 2,463,137 | Bahlke | Mar. 1, 1949 |
| 2,550,853 | Nugent | May 1, 1951 |